United States Patent
Sima et al.

(10) Patent No.: US 12,260,481 B1
(45) Date of Patent: Mar. 25, 2025

(54) METHOD FOR GENERATING A DYNAMIC IMAGE BASED ON AUDIO, DEVICE, AND STORAGE MEDIUM

(71) Applicant: NANJING SILICON INTELLIGENCE TECHNOLOGY CO., LTD., Nanjing (CN)

(72) Inventors: Huapeng Sima, Nanjing (CN); Maolin Zhang, Nanjing (CN); Liyan Mao, Nanjing (CN)

(73) Assignee: NANJING SILICON INTELLIGENCE TECHNOLOGY CO., LTD., Nanjing (CN)

( * ) Notice: Subject to any disclaimer, the term of this patent is extended or adjusted under 35 U.S.C. 154(b) by 0 days.

(21) Appl. No.: 18/777,676

(22) Filed: Jul. 19, 2024

(30) Foreign Application Priority Data

Jan. 8, 2024 (CN) .......................... 202410022841.6

(51) Int. Cl.
  *G06T 13/00* (2011.01)
  *G06T 7/70* (2017.01)
  (Continued)

(52) U.S. Cl.
  CPC ................ *G06T 13/00* (2013.01); *G06T 7/74* (2017.01); *G06V 10/7715* (2022.01);
  (Continued)

(58) Field of Classification Search
  CPC ............. G06V 10/778; G06V 10/7715; G06V 10/764; G06V 10/82; G06V 10/25;
  (Continued)

(56) References Cited

U.S. PATENT DOCUMENTS

| | | | |
|---|---|---|---|
| 9,898,849 B2 * | 2/2018 | Du | ........................ G06V 40/171 |
| 11,615,760 B2 * | 3/2023 | Cho | ........................ G06F 3/011 |
| | | | 345/204 |

(Continued)

FOREIGN PATENT DOCUMENTS

| | | | | |
|---|---|---|---|---|
| CN | 103400145 A | * | 11/2013 | |
| CN | 103400145 B | * | 8/2016 | ............. G06V 20/46 |

(Continued)

OTHER PUBLICATIONS

Liu: Research on Audio Driven Talking Face Generation. A Dissertation Submitted for the Degree of Master. Apr. 5, 2022, 70 pages.

*Primary Examiner* — Wesner Sajous
(74) *Attorney, Agent, or Firm* — Laine IP Oy

(57) ABSTRACT

Disclosed are a method for generating a dynamic image based on audio, a device, and a storage medium, relating to the field of natural human-computer interactions. The method includes: obtaining a reference image and reference audio input by a user; determining a target head pose feature and a target expression coefficient feature based on the reference image and a trained generation network model, and adjusting the trained generation network model based on the target head pose feature and the target expression coefficient feature, to obtain a target generation network model; and processing a to-be-processed image based on the reference audio, the reference image, and the target generation network model, to obtain a target dynamic image. An image object in the to-be-processed image is same as that in the reference image. In this case, a corresponding digital person can be obtained based on a single picture of a target person.

9 Claims, 12 Drawing Sheets

(51) Int. Cl.
  *G06T 7/73* (2017.01)
  *G06T 13/20* (2011.01)
  *G06V 10/77* (2022.01)
  *G06V 10/778* (2022.01)
  *G06V 20/40* (2022.01)
  *G06V 40/16* (2022.01)
  *G10L 15/02* (2006.01)
  *G10L 25/24* (2013.01)

(52) U.S. Cl.
  CPC ............ *G06V 10/778* (2022.01); *G06V 20/46* (2022.01); *G06V 40/174* (2022.01); *G10L 15/02* (2013.01); *G10L 25/24* (2013.01); *G06T 2207/10016* (2013.01); *G06T 2207/20081* (2013.01); *G06T 2207/30201* (2013.01)

(58) Field of Classification Search
  CPC ........ G06V 20/20; G06V 20/40; G06V 20/46; G06V 40/174; G06V 40/176; G06V 40/103; G06V 40/23; G01L 15/02; G01L 25/24; G01L 25/69; G06N 3/045; G06N 3/084; G06N 5/022; G06T 13/205; G06T 13/00; G06T 7/74; G06T 2207/10016; G06T 2207/20081; G06T 2207/30201; G06T 2207/20084; G06T 2207/20076; G06T 2207/30196; G06T 2207/10024; G06T 17/00; G06T 7/90; G06T 7/70; G06T 13/40; G06F 18/213–214; G06F 18/2137; G06F 18/2113
  See application file for complete search history.

(56) References Cited

U.S. PATENT DOCUMENTS

| | | | |
|---|---|---|---|
| 11,810,549 B2 * | 11/2023 | Yoon | ........................ G10L 15/16 |
| 2016/0300379 A1 * | 10/2016 | Du | ........................ G06T 13/205 |
| 2021/0183391 A1 * | 6/2021 | Lin | ........................ G06T 7/50 |
| 2022/0036636 A1 * | 2/2022 | Lin | ........................ G06T 19/00 |
| 2024/0212252 A1 * | 6/2024 | Wu | ........................ G06V 20/46 |
| 2024/0257554 A1 * | 8/2024 | Xu | ........................ G06V 40/172 |

FOREIGN PATENT DOCUMENTS

| | | | | |
|---|---|---|---|---|
| CN | 107004287 A | 8/2017 | | |
| CN | 113192162 A | 7/2021 | | |
| CN | 115700772 A | 2/2023 | | |
| CN | 115984452 A | 4/2023 | | |
| CN | 116403144 A | 7/2023 | | |
| CN | 116824650 A | 9/2023 | | |
| CN | 117036555 A | 11/2023 | | |
| WO | WO-2019108250 A1 * | 6/2019 | ............ | G06F 17/18 |
| WO | WO2021052224 A1 | 3/2021 | | |

* cited by examiner

METHOD FOR GENERATING A DYNAMIC IMAGE BASED ON AUDIO, DEVICE, AND STORAGE MEDIUM

CROSS-REFERENCE TO RELATED APPLICATIONS

This application claims priority to Chinese Patent Application No. 202410022841.6, entitled "METHOD AND APPARATUS FOR GENERATING A DYNAMIC IMAGE BASED ON AUDIO, DEVICE, AND STORAGE MEDIUM", filed with the China National Intellectual Property Administration (CNIPA) on Jan. 8, 2024, the entire disclosure of which is incorporated by reference in its entirety herein.

FIELD OF THE INVENTION

The present invention relates to the field of natural human-computer interactions, and in particular, to a method and an apparatus for generating a dynamic image based on audio, a device, and a storage medium.

BACKGROUND OF THE INVENTION

A digital person (digital human/meta human) is a digitized person image that is close to a human image and is created by using digital technologies. At present, a production process of the digital person is: collecting video data during speaking of a target person; subsequently, learning a corresponding relationship between voice and lip sync of the target person in the video data by using a deep learning network (such as a GAN network model), to obtain a trained network model; and finally, inputting new audio into the trained network model, so that the trained network model generates a lip-sync animation corresponding to the audio. Thus, production of the digital person is completed.

However, the foregoing production manner for the digital person requires a lot of video collection work and data cleaning work. To be specific, to generate a corresponding digital person, a user needs to obtain a large amount of video data during speaking of the user. Moreover, to ensure effects of the obtained digital person, there are also certain requirements for quality of the video data during the speaking of the user. As a result, generation of the digital person corresponding to the user is cumbersome, costly, and time-consuming.

SUMMARY OF THE INVENTION

This application provides a method and an apparatus for generating a dynamic image based on audio, a device, and a storage medium, which can obtain a dynamic image of a target person based on a single picture of the target person, so as to obtain a digital person. In this way, there is no need for video collection work or data cleaning work, which can reduce production costs of the digital person and shorten a production period of the digital person.

A first aspect of this application provides a method for generating a dynamic image based on audio, including:
  obtaining a reference image and reference audio input by a user;
  determining a target head pose feature and a target expression coefficient feature based on the reference image and a trained generation network model;
  adjusting the trained generation network model based on the target head pose feature and the target expression coefficient feature, to obtain a target generation network model; and
  processing a to-be-processed image based on the reference audio, the reference image, and the target generation network model, to obtain a target dynamic image, wherein the target dynamic image represents a dynamic image indicating that a target person in the to-be-processed image changes a facial expression based on the reference audio, and an image object in the to-be-processed image is same as that in the reference image.

In the foregoing technical solution, the determining a target head pose feature and a target expression coefficient feature based on the reference image and a trained generation network model includes:
  obtaining reference data based on the reference image; and
  extracting the target head pose feature and the target expression coefficient feature from the reference data by using the trained generation network model.

In the foregoing technical solutions, the extracting the target head pose feature and the target expression coefficient feature from the reference data by using the trained generation network includes:
  determining multiple frames of facial images of the target person from the reference data by using the trained generation network model; and
  performing feature extraction based on various frames of facial images of the target person by using the trained generation network model, to obtain the target head pose feature and the target expression coefficient feature.

In the foregoing technical solutions, the target generation network model includes an affine subnetwork and a driving subnetwork; and
  the processing a to-be-processed image based on the reference audio, the reference image, and the target generation network model, to obtain a target dynamic image includes:
  processing the to-be-processed image by using the affine subnetwork to obtain a to-be-processed feature map, and obtaining a deformation feature map based on the reference audio, the reference image, and the to-be-processed feature map by using the affine subnetwork; and
  processing the to-be-processed image based on the deformation feature map by using the driving subnetwork, to obtain the target dynamic image.

In the foregoing technical solutions, the affine subnetwork includes a speech processing layer, a feature extraction layer, a feature fusion layer, and a feature affine layer; and
  the processing the to-be-processed image by using the affine subnetwork to obtain a to-be-processed feature map, and obtaining a deformation feature map based on the reference audio, the reference image, and the to-be-processed feature map by using the affine subnetwork includes:
  determining a target Mel-frequency cepstral coefficient corresponding to the reference audio by using the speech processing layer;
  performing feature extraction on the reference image by using the feature extraction layer, to obtain a reference feature map;
  performing feature extraction on the to-be-processed image by using the feature extraction layer, to obtain the to-be-processed feature map;
  performing feature stacking and alignment on the reference feature map and the to-be-processed feature map by using the feature fusion layer, to obtain a fused feature map; and determining an affine coefficient based on the fused feature map and the target Mel-frequency cepstral coefficient by using the feature affine layer, and performing spatial deformation in affine transformation on the reference feature map based on the affine coefficient, to obtain the deformation feature map.

In the foregoing technical solutions, the driving subnetwork includes a feature processing layer, a feature synchronization layer, and an image driving layer; and the processing the to-be-processed image based on the deformation feature map by using the driving subnetwork, to obtain the target dynamic image includes:

obtaining an initial driving feature based on the target Mel-frequency cepstral coefficient by using the feature processing layer;

driving the to-be-processed feature map based on the initial driving feature by using the image driving layer, to obtain an initial feature map;

stacking the deformation feature map with the initial feature map by using the feature synchronization layer, to determine a feature synchronization parameter between the deformation feature map and the initial feature map;

adjusting the initial driving feature based on the feature synchronization parameter by using the feature processing layer, to obtain a target driving feature; and driving the to-be-processed image based on the target driving feature by using the image driving layer, to obtain the target dynamic image.

In the foregoing technical solutions, the method further includes:

obtaining a sample video, wherein a video object in the sample video is different from an image object in the to-be-processed image;

processing the sample video by using a to-be-trained generation network model, to extract sample audio data and sample image data;

processing the sample audio data and the sample image data by using the to-be-trained generation network model, to obtain a predicted training result; and iteratively training the to-be-trained generation network model by using the predicted training result as initial training output of the to-be-trained generation network model and using the sample image data as supervisory information, to obtain the trained generation network model.

In the foregoing technical solutions, the processing the sample audio data and the sample image data by using the to-be-trained generation network model, to obtain a predicted training result includes:

extracting a reference Mel-frequency cepstral coefficient from the sample audio data by using the to-be-trained generation network model;

extracting a reference head pose, a reference expression coefficient feature, and a reference face feature from the sample image data by using the to-be-trained generation network model; and obtaining the predicted training result based on the reference Mel-frequency cepstral coefficient, the reference head pose, the reference expression coefficient feature, and the reference face feature by using the to-be-trained generation network model.

In the foregoing technical solutions, the iteratively training the to-be-trained generation network model by using the predicted training result as initial training output of the to-be-trained generation network model and using the sample image data as supervisory information, to obtain the trained generation network model includes:

determining a loss value based on the predicted training result and the sample image data; and iteratively updating the to-be-trained generation network model based on the loss value, to obtain the trained generation network model.

A second aspect of this application provides an apparatus for generating a dynamic image based on audio, including:

an obtaining module, configured to obtain a reference image and reference audio input by a user;

a processing module, configured to determine a target head pose feature and a target expression coefficient feature based on the reference image and a trained generation network model; and an adjustment module, configured to adjust the trained generation network model based on the target head pose feature and the target expression coefficient feature, to obtain a target generation network model, wherein the processing module is further configured to process a to-be-processed image based on the reference audio, the reference image, and the target generation network model, to obtain a target dynamic image, wherein the target dynamic image represents a dynamic image indicating that a target person in the to-be-processed image changes a facial expression based on the reference audio, and an image object in the to-be-processed image is same as that in the reference image.

A third aspect of this application provides an electronic device, including a memory, a processor, and a computer program stored in the memory and capable of running on the processor, wherein the processor executes the program to implement steps of the method according to any one of the foregoing embodiments.

A fourth aspect of this application provides a non-transient computer readable storage medium, on which a computer program is stored, wherein the computer program implements steps of the method according to any one of the foregoing embodiments while being executed by a processor.

Embodiments of this application provide a method and an apparatus for generating a dynamic image based on audio, a device, and a storage medium. The method for generating a dynamic image based on audio includes: obtaining the reference image and the reference audio input by the user; determining the target head pose feature and the target expression coefficient feature based on the reference image and the trained generation network model; adjusting the trained generation network model based on the target head pose feature and the target expression coefficient feature, to obtain the target generation network model; and processing the to-be-processed image based on the reference audio, the reference image, and the target generation network model, to obtain the target dynamic image. The target dynamic image represents the dynamic image indicating that the target person in the to-be-processed image changes the facial expression based on the reference audio. The image object in the to-be-processed image is same as that in the reference image. In this case, a digital person (the dynamic image indicating that the target person changes the facial expression based on the reference audio) may be obtained based on a single picture (the reference image) of the target person. In this way, there is no need for video collection work or data cleaning work, which can reduce production costs of the digital person and shorten a production period of the digital person.

BRIEF DESCRIPTION OF THE DRAWINGS

To more clearly describe the technical solutions in the embodiments of this application, the accompanying drawings required in the embodiments are briefly illustrated below. Apparently, the accompanying drawings in the description below are merely some embodiments of the present invention, and other accompanying drawings may also be obtained by one of ordinary skills in the art according to these accompanying drawings without an effective effort.

DETAILED DESCRIPTION OF THE EMBODIMENTS

To make objectives, technical solutions, and advantages of this application more clear, the technical solutions of this application are clearly and completely described below with reference to the accompanying drawings in this application.

A digital person (digital human/meta human) is a digitized person image that is close to a human image and is created by using digital technologies. With popularization of the concept of the metaverse, digital persons have entered public life. At present, a production process of the digital person is: collecting video data during speaking of a target person; subsequently, learning a corresponding relationship between voice and lip sync of the target person in the video data by using a deep learning network (such as a GAN network model), to obtain a trained network model; and finally, inputting new audio into the trained network model, so that the trained network model generates a lip-sync animation corresponding to the audio. Thus, production of the digital person is completed.

However, the foregoing production manner for the digital person requires a lot of video collection work and data cleaning work. To be specific, to generate a corresponding digital person, a user needs to obtain a large amount of video data during speaking of the user. Moreover, to ensure effects of the obtained digital person, there are also certain requirements for quality of the video data during the speaking of the user. Moreover, because the video data needs to be split into frames for learning, a volume of the data is large, and requirements for hardware configuration of a device are also high. As a result, generation of the digital person corresponding to the user is cumbersome, costly, and time-consuming.

To resolve the foregoing technical problem, this application provides a method for generating a dynamic image based on audio. In this case, a digital person (a dynamic image indicating that a target person changes a facial expression based on reference audio) can be obtained based on a single picture (a reference image) of the target person. In this way, there is no need for video collection work or data cleaning work, which can reduce production costs of the digital person and shorten a production period of the digital person.

Figure 1:
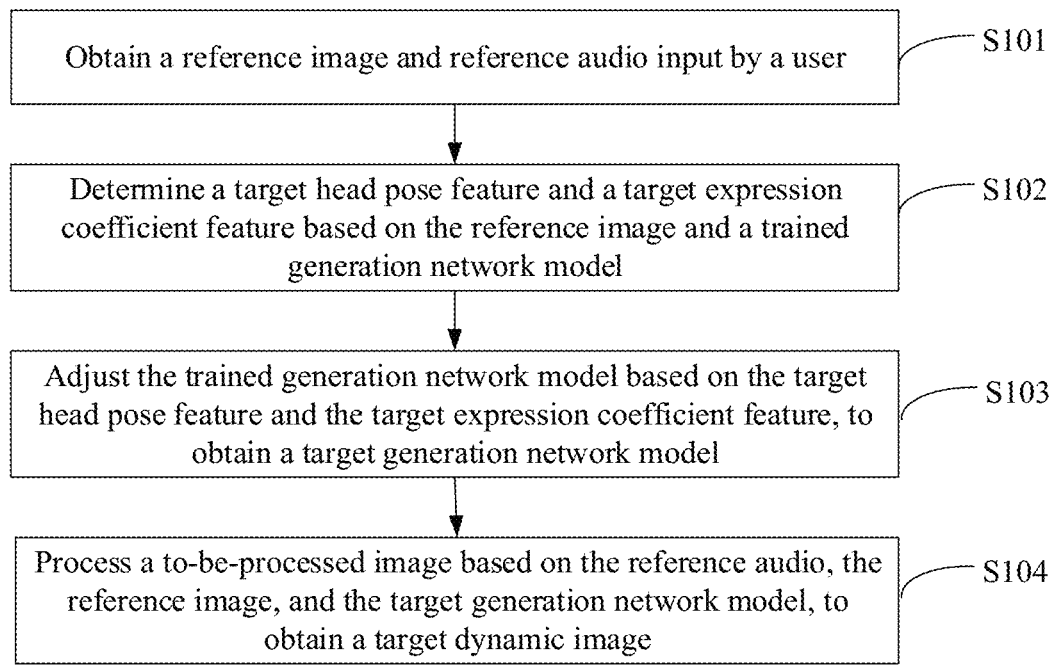
FIG. 1 is a schematic flowchart of a method for generating a dynamic image based on audio according to an embodiment of this application.

Referring to FIG. 1, an embodiment of this application provides a method for generating a dynamic image based on audio, including S101-S104.

S101. Obtain a reference image and reference audio input by a user.

In some embodiments, the reference image input by the user is a single picture of a target person. In other words, there is one reference image. The reference image displays face information of a head of the target person. To be specific, the reference image can completely expose a face or a mouth area of the person. The reference image may be an image downloaded from the Internet; may be a person image captured by a user by using a mobile terminal with a camera function; or may be a virtual digital person image, an animated person image, or the like. Manners for obtaining the reference image and types of the person in the reference image are not limited in the embodiments of this application. In the following embodiments, exemplary description is made by using an example in which the reference image is captured.

In some embodiments, the reference audio input by the user may be audio downloaded from the Internet, or may be audio recorded by the user. Manners for obtaining the reference audio are not limited in the embodiments of this application. In the following embodiments, exemplary description is made by using an example in which the reference audio is downloaded from the Internet.

In some embodiments, the obtained reference image may be a preprocessed reference image, or may be an unprocessed reference image; and the obtained reference audio may be a preprocessed reference audio, or may be unprocessed reference audio. If the reference image and/or the reference audio has not been preprocessed, after S101, the reference image and/or the reference audio needs to be preprocessed. Methods for preprocessing the reference image may include cropping, noise reduction, and the like. Methods for preprocessing the reference audio may include noise reduction, audio enhancement, editing, and the like. Time and manners for preprocessing the reference image and/or the reference audio are not limited in the embodiments of this application. In the following embodiments, exemplary description is made by using an example in which the reference image and the reference audio input by the user in S101 are both preprocessed.

S102. Determine a target head pose feature and a target expression coefficient feature based on the reference image and a trained generation network model.

In some embodiments, the reference image is input into a trained network model. The reference image may be processed by using the trained generation network model, so as to determine the target head pose feature and the target expression coefficient feature from the reference image. The trained generation network model includes a plurality of generators. The trained generation network model generates a plurality of predicted images based on the reference images by using the various generators. Subsequently, the target head pose feature and the target expression coefficient feature are learned and determined based on differences between each predicted image and the reference image.

It should be noted that, when there is only one person in the reference image, the trained generation network model may directly process the reference image to determine the target head pose feature and the target expression coefficient feature. When there are a plurality of persons in the reference image, the trained generation network model may recognize a quantity of the persons in the reference image and select a person with a entirely exposed face as the target person.

Figure 2:
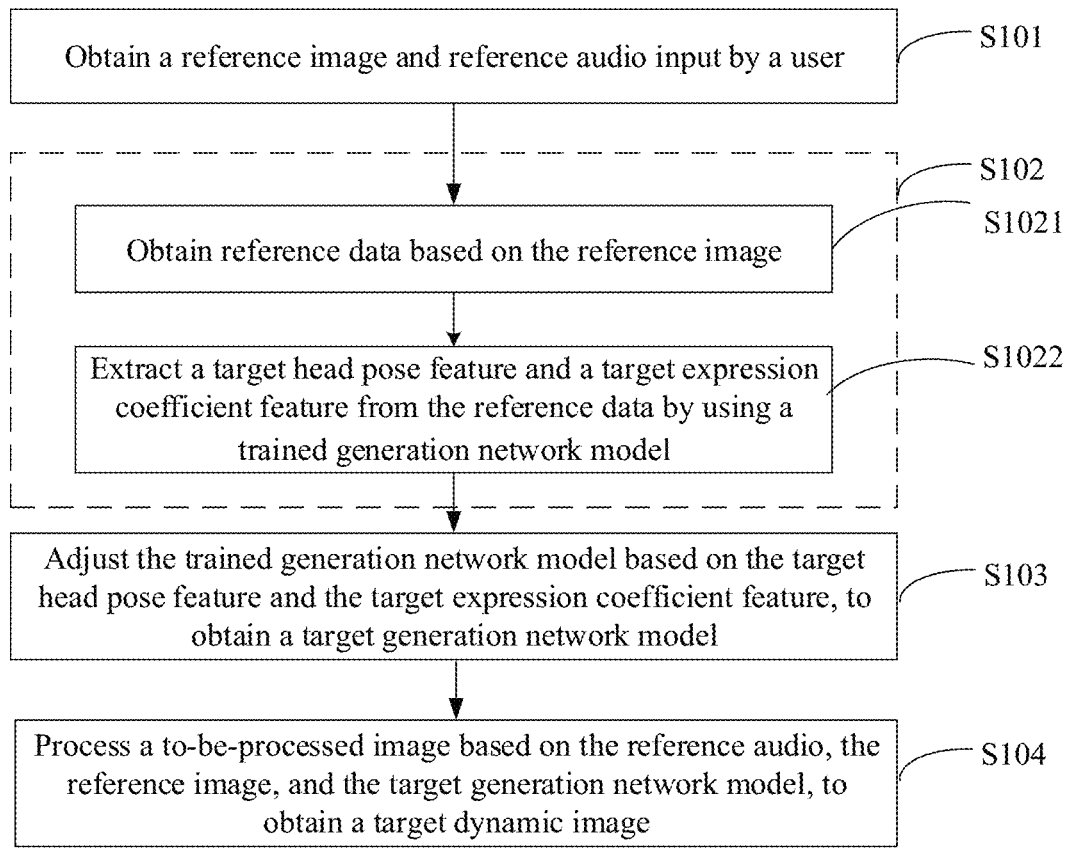
FIG. 2 is a schematic flowchart of another method for generating a dynamic image based on audio according to an embodiment of this application.

Referring to FIG. 2, in some embodiments, S102 may include S1021-S1022.

S1021. Obtain reference data based on the reference image.

In some embodiments, a video with preset duration is generated based on the reference image, and the video is processed to obtain the reference data. The video with the preset duration that is generated based on the reference image may be a silent video. In other words, audio in the video is blank.

For example, a video of 1 minute is generated based on the reference image, and the video of 1 minute is processed in unit of frame. Each frame of the image is a reference image.

In some embodiments, the reference data may be obtained based on the reference image by using the trained generation network model, or may be obtained based on the reference image by using an electronic device provided with the trained generation network model before the reference data is input into the trained generation network model.

Manners for generating the reference data audio are not limited in the embodiments of this application. In the embodiments of this application, exemplary description is made by using an example in which the reference data is obtained based on the reference image by using the trained generation network model.

S1022. Extract the target head pose feature and the target expression coefficient feature from the reference data by using the trained generation network model.

In some embodiments, the reference data is input into the trained generation network model, so as to determine a target face part from the reference data by using the trained generation network model. Subsequently, the target head pose feature and the target expression coefficient feature are extracted from the target face part.

For example, the target head pose feature may represent an orientation of the head of the target person, and may also represent a head pose of the target person. The target expression coefficient feature may represent at least one mouth action of the target person, and may also represent actions of other organs, except the mouth, of the target person, such as an eye. Content of the target head pose feature and content of the target expression coefficient feature are not limited in the embodiments of this application. In the embodiments of this application, exemplary description is made by using an example in which the target head pose feature includes information about the head pose of the target person, and the target expression coefficient feature includes information about the mouth action of the target person.

Figure 3:
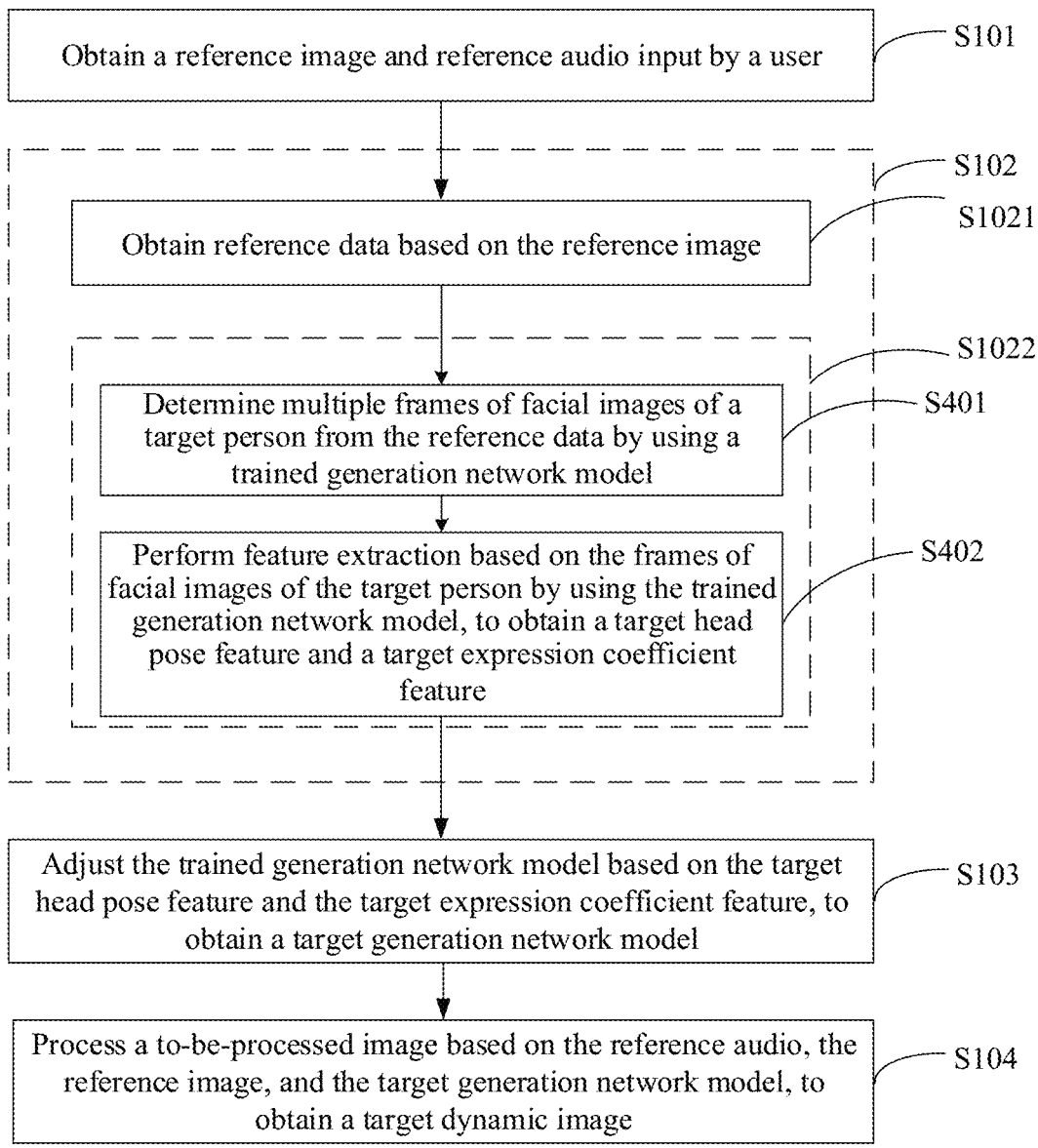
FIG. 3 is a schematic flowchart of still another method for generating a dynamic image based on audio according to an embodiment of this application.

Referring to FIG. 3, in some embodiments, S1022 may include S401-S402.

S401. Determine multiple frames of facial images of the target person from the reference data by using the trained generation network model.

In some embodiments, after the reference data is input into the trained generation network model, the trained generation network model learns based on the reference data to determine the multiple frames of facial images of the target person from the reference data.

S402. Perform feature extraction based on frames of facial images of the target person by using the trained generation network model, to obtain the target head pose feature and the target expression coefficient feature.

In some embodiments, corresponding features are extracted from the frames of facial images of the target person by using the trained generation network model, that is, the frames of facial images of the target person are extracted, so as to obtain the target head pose feature and the target expression coefficient feature.

S103. Adjust the trained generation network model based on the target head pose feature and the target expression coefficient feature, to obtain a target generation network model.

In some embodiments, parameters of the trained generation network model are adjusted based on the target head pose feature and the target expression coefficient feature, so that the trained generation network model is closer to the target person. The target generation network model is obtained after the trained generation network model is adjusted.

S104. Process a to-be-processed image based on the reference audio, the reference image, and the target generation network model, to obtain a target dynamic image.

The target dynamic image represents a dynamic image indicating that the target person in the to-be-processed image changes a facial expression based on the reference audio. An image object in the to-be-processed image is same as that in the reference image.

In some embodiments, the reference audio and the reference image are input into the target generation network model, and the to-be-processed image is processed based on the reference audio and the reference image by using a target generation network model, to obtain the target dynamic image. A target area in the target dynamic image changes according to the reference audio, so that the facial expression of the target person in the to-be-processed image changes according to the reference audio.

For example, the target area includes at least one of the mouth area, an eye area, a nose area, an ear area, and an eyebrow area. The target area is not limited in the embodiments of this application. In the embodiments of this application, exemplary description is made by using an example in which the target area includes the mouth area, the eye area, and the eyebrow area. In some embodiments, the reference audio includes text and speech.

For example, if reference speech is "Welcome to experience", in a target dynamic image obtained based on text and speech of "Welcome to experience" by using the target generation network, changes in a facial expression of a target person correspond to the text and speech of "Welcome to experience".

Figure 4:
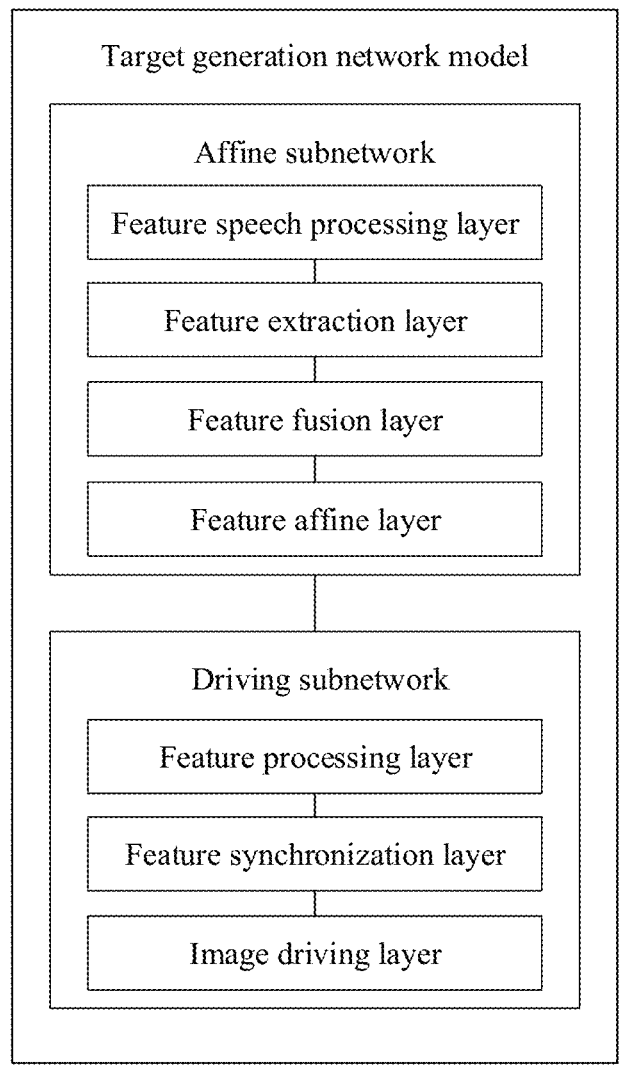
FIG. 4 is a schematic diagram of a structure of a target generation network model according to an embodiment of this application.

Because the target generation network model is obtained by adjusting the trained generation network model based on the target head pose feature and the target expression coefficient feature, a model structure of the target generation network model is same that of the trained generation network model. As shown in FIG. 4, in some embodiments, the target generation network model includes an affine subnetwork and a driving subnetwork. The affine subnetwork includes a feature speech processing layer, a feature extraction layer, a feature fusion layer, and a feature affine layer. The driving subnetwork includes a feature processing layer, a feature synchronization layer, and an image driving layer.

Figure 5A:
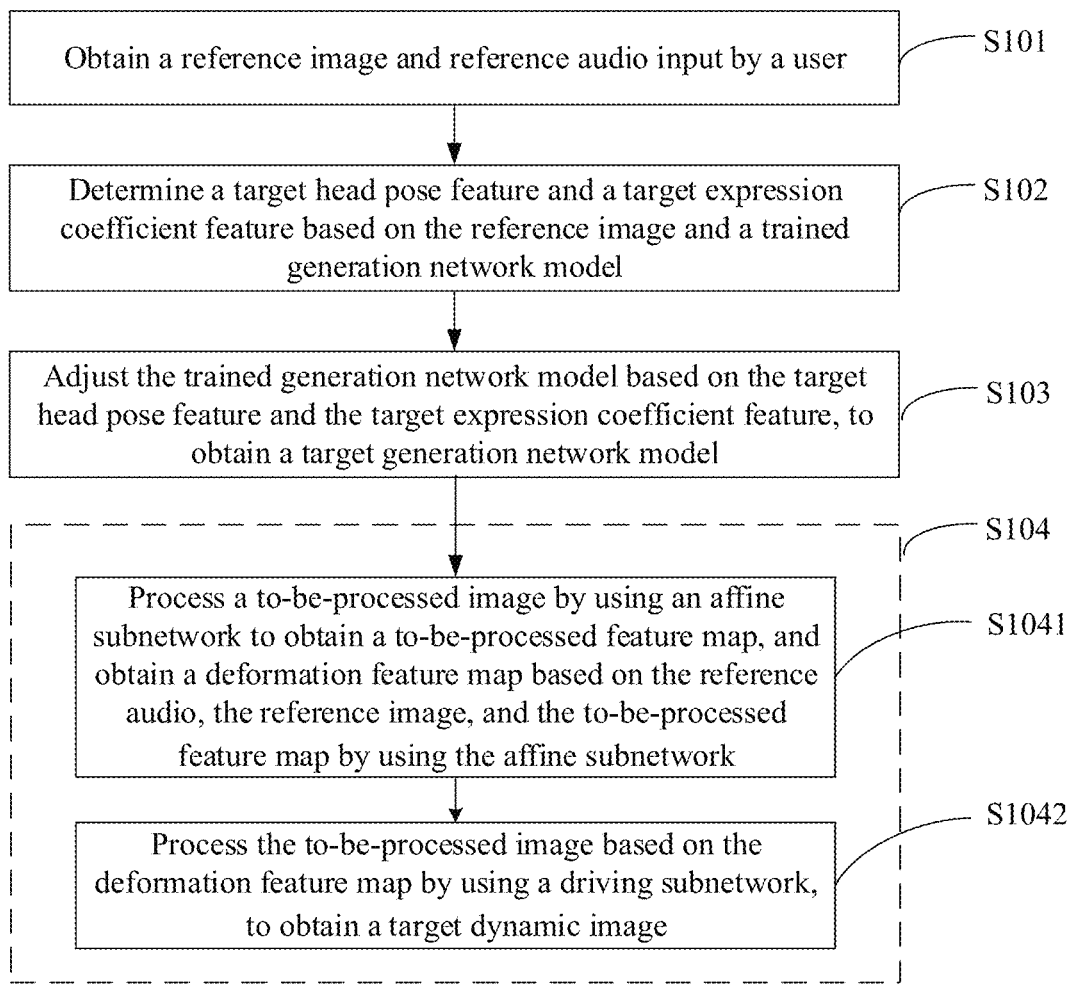
FIG. 5A is a schematic flowchart of yet another method for generating a dynamic image based on audio according to an embodiment of this application.

Based on FIG. 4, as shown in FIG. 5A, in some embodiments, S104 may include S1041-S1042.

S1041. Process the to-be-processed image by using an affine subnetwork to obtain a to-be-processed feature map, and obtain a deformation feature map based on the reference audio, the reference image, and the to-be-processed feature map by using the affine subnetwork.

In some embodiments, the affine subnetwork includes a speech processing layer, the feature extraction layer, the feature fusion layer, and the feature affine layer.

Figure 5B:
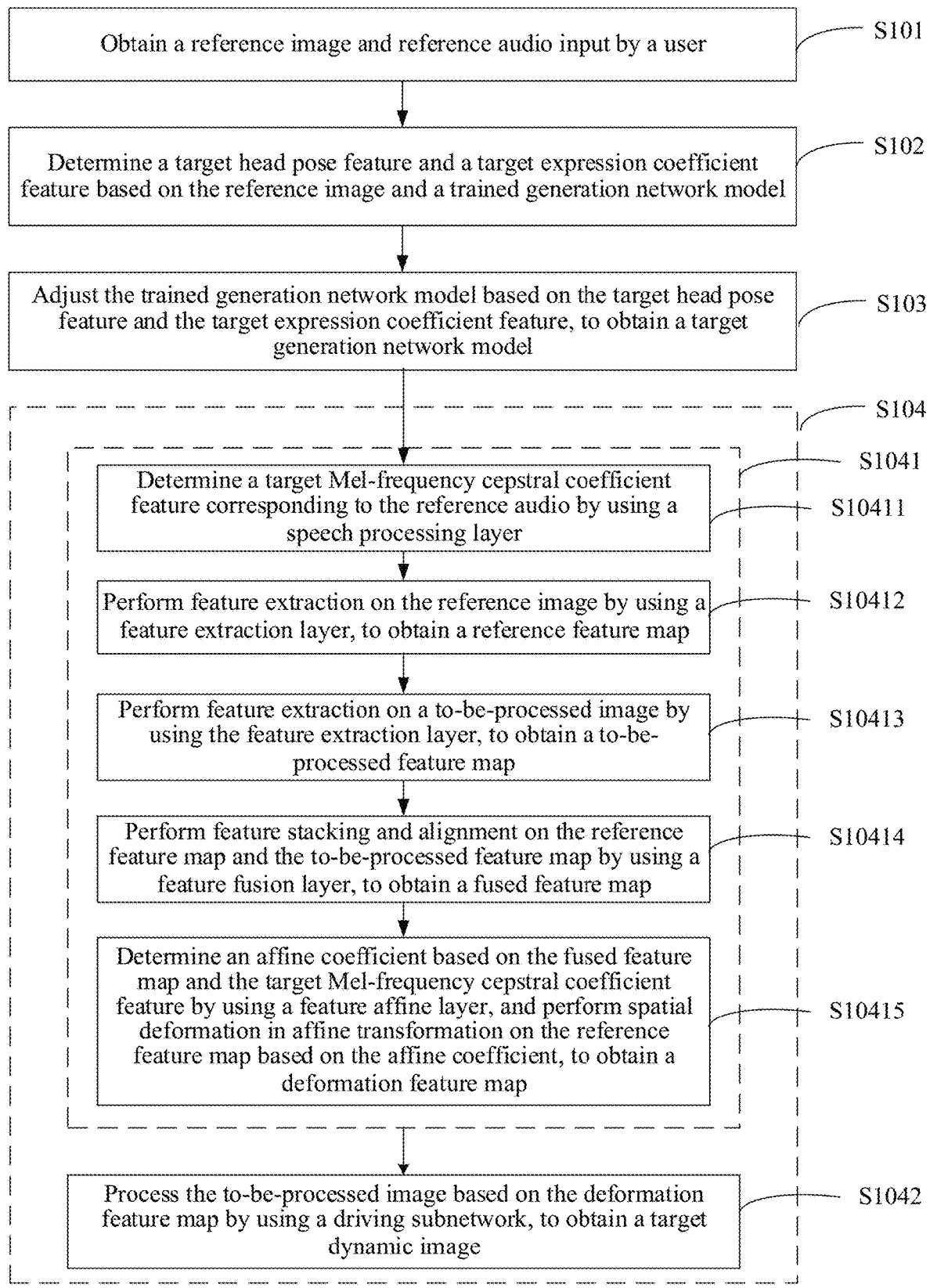
FIG. 5B is a schematic flowchart of still yet another method for generating a dynamic image based on audio according to an embodiment of this application.

Referring to FIG. 5B, in some embodiments, S1041 may include S10411-S10415.

S10411. Determine a target Mel-frequency cepstral coefficient corresponding to the reference audio by using the speech processing layer.

In some embodiments, the speech processing layer converts an energy spectrum of the reference audio in a frequency domain into energy distribution in a Mel-frequency scale, so as to determine the target Mel-frequency cepstral coefficient corresponding to the reference audio from the reference audio.

S10412. Perform feature extraction on the reference image by using the feature extraction layer, to obtain a reference feature map.

In some embodiments, feature extraction is performed on the reference image by using the feature extraction layer to obtain feature vectors of all pixels in the reference image, so that the reference feature map corresponding to the reference image is obtained.

S10413. Perform feature extraction on the to-be-processed image by using the feature extraction layer, to obtain the to-be-processed feature map.

In some embodiments, feature extraction is performed on the to-be-processed image by using the feature extraction layer to obtain feature vectors of the pixels in the to-be-processed image, so that the to-be-processed feature map corresponding to the to-be-processed image is obtained.

S10414. Perform feature stacking and alignment on the reference feature map and the to-be-processed feature map by using the feature fusion layer, to obtain a fused feature map.

For example, the reference feature map is stacked with the to-be-processed feature map by using the feature fusion layer. Subsequently, the reference feature map and the to-be-processed feature map that are stacked together are input into an alignment encoder to obtain the fused feature map.

S10415. Determine an affine coefficient based on the fused feature map and the target Mel-frequency cepstral coefficient by using the feature affine layer, and perform spatial deformation in affine transformation on the reference feature map based on the affine coefficient, to obtain the deformation feature map.

For example, after the affine coefficient is determined, the spatial deformation in the affine transformation is performed on each feature channel in the reference feature map based on the affine coefficient to obtain the deformation feature map.

S1042. Process the to-be-processed image based on the deformation feature map by using the driving subnetwork, to obtain the target dynamic image.

In some embodiments, the driving subnetwork includes the feature processing layer, the feature synchronization layer, and the image driving layer.

Figure 5C:
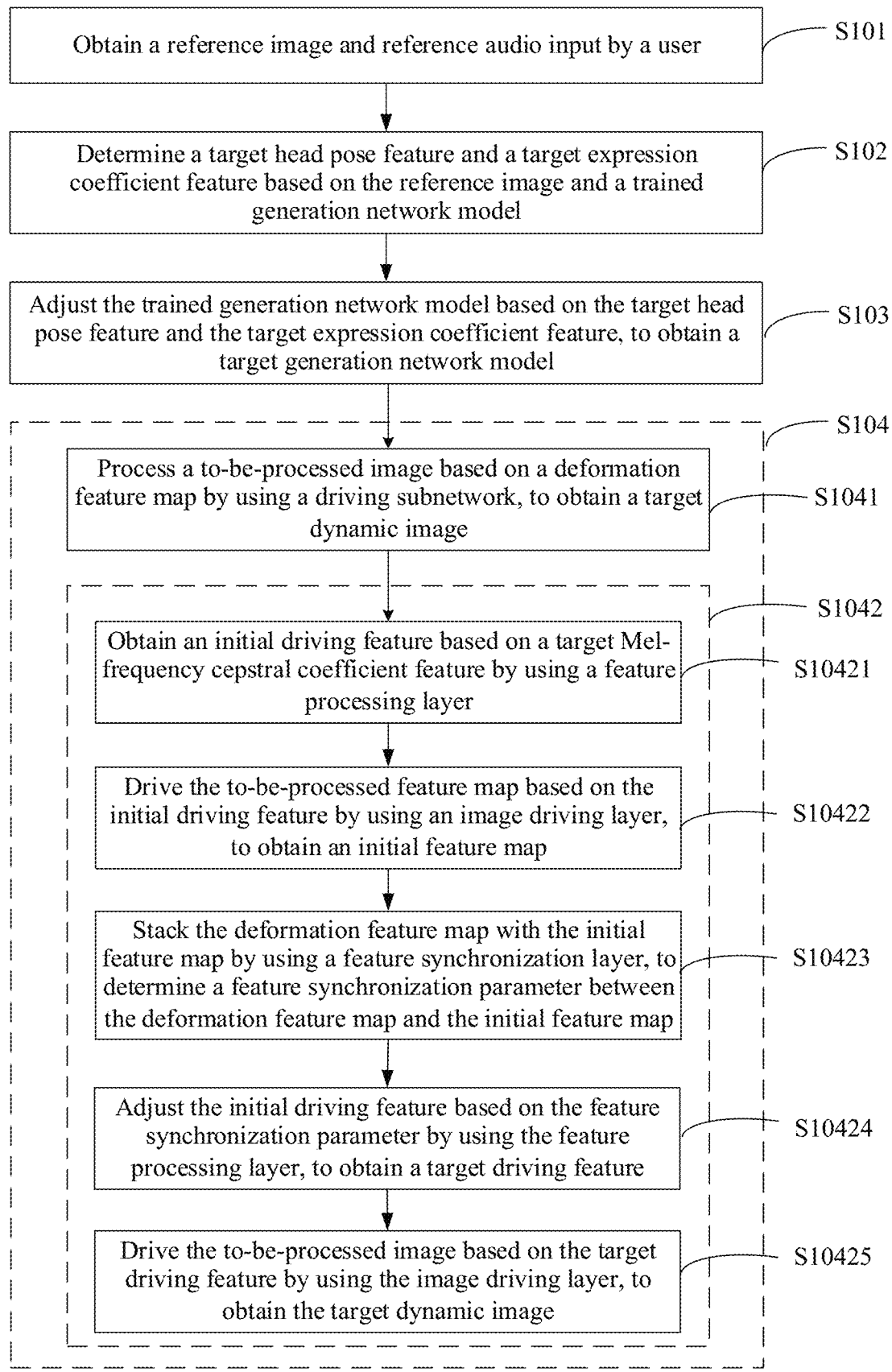
FIG. 5C is a schematic flowchart of a further method for generating a dynamic image based on audio according to an embodiment of this application.

Referring to FIG. 5C, in some embodiments, S1042 may include S10421-S10425.

S10421. Obtain an initial driving feature based on the target Mel-frequency cepstral coefficient by using the feature processing layer.

S10422. Drive the to-be-processed feature map based on the initial driving feature by using the image driving layer, to obtain an initial feature map.

S10423. Stack the deformation feature map with the initial feature map by using the feature synchronization layer, to determine a feature synchronization parameter between the deformation feature map and the initial feature map.

S10424. Adjust the initial driving feature based on the feature synchronization parameter by using the feature processing layer, to obtain a target driving feature.

S10425. Drive the to-be-processed image based on the target driving feature by using the image driving layer, to obtain the target dynamic image.

For example, the target driving feature represents the target area in the to-be-processed image. The target area in the to-be-processed image is driven based on the target driving feature by using the image driving layer, to obtain the target dynamic image. For example, the mouth area in the target area is driven, so that the mouth of the target person in the to-be-processed image changes from a closed state to an "O"-shaped state. The eye area in the target area is driven, so that an eye of the target person in the to-be-processed image changes from an open state to a closed state. The eyebrow area in the target area is driven, so that an eyebrow of the target person in the to-be-processed image is raised. It should be noted that, in the case where the target area includes a plurality of areas, when a plurality of target areas in the to-be-processed image are driven by using the image driving layer, the plurality of target areas may be driven sequentially. For example, the mouth area is driven first, and then the eye area is driven, and finally, the eyebrow area is driven. Alternatively, the plurality of target areas may be driven simultaneously. This is not limited in the embodiments of this application.

In some embodiments, the target Mel-frequency cepstral coefficient corresponding to the reference audio may be obtained by performing feature extraction on the reference audio by using the target generation network model; may be determined by preprocessing the reference audio; or may be obtained by processing the reference audio by using another model in an electronic device provided with the target generation network model. Manners for determining the target Mel-frequency cepstral coefficient corresponding to the reference audio are not limited in the embodiments of this application. In the embodiments of this application, exemplary description is made by using an example in which the target Mel-frequency cepstral coefficient corresponding to the reference audio is obtained by processing the reference audio by using another model in the electronic device provided with the target generation network model.

It may be understood that, according to the method for generating a dynamic image based on audio provided in this application, head poses and expressions of other persons, and a corresponding relationship between audio and lip sync can be learned and transferred to a single to-be-processed image (picture) by using the trained generation network model. In this way, a single to-be-processed image can be used to create a digital person with changes in head poses and expressions and can be driven by any audio. Thus, there is no need for video collection work or data cleaning work, which can reduce production costs of the digital person. Moreover, because there is one, that is, one frame of to-be-processed image, an amount of to-be-processed data can be reduced. In this way, a production period of the digital person is shortened.

Figure 6:
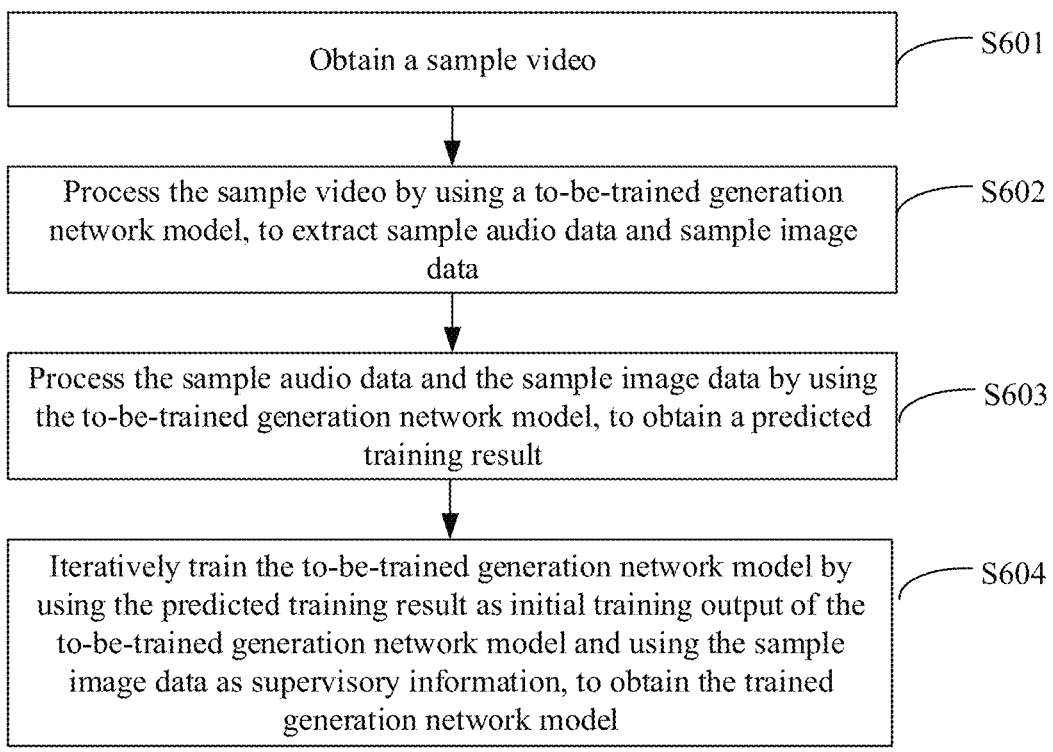
FIG. 6 is a schematic flowchart of a still further method for generating a dynamic image based on audio according to an embodiment of this application.

Referring to FIG. 6, in some embodiments, the method for generating a dynamic image based on audio provided in this application provides further includes S601-S604.

S601. Obtain a sample video.

A video object in the sample video is different from an image object in the to-be-processed image.

In some embodiments, the sample video displays face information of a head of a person (any third person), and includes a quantity of to-be-extracted audio. In other words, the sample video displays the face information during speaking of the person. In this way, a facial expression during speaking of the person can be determined through the sample video.

The sample video may be a video downloaded from a public channel (such as the Internet); may be a person video captured by the user by using the mobile terminal with a camera function; or may be a virtual digital person image, an animated person image, or the like. Manners for obtaining the sample video and types of the person in the sample video are not limited in the embodiments of this application. In the following embodiments, exemplary description is made by using an example in which the sample video is downloaded from the Internet.

In some embodiments, one sample video may be obtained, or a plurality of sample videos may be obtained to ensure subsequent training effects for a to-be-trained generation network model. A quantity of obtained sample videos is not limited in the embodiments of this application. In the following embodiments, exemplary description is made by using an example in which a plurality of sample videos are obtained.

S602. Process the sample video by using a to-be-trained generation network model, to extract sample audio data and sample image data.

In some embodiments, the sample video is input into the to-be-trained generation network model as training data. The sample video is processed by using the to-be-trained generation network model, to extract the sample audio data and the sample image data from the sample video. The sample image data includes at least one sample image. The sample image displays the face information of the head of the person.

In some embodiments, facial expressions of persons in various sample images may be the same or different. A quantity of sample images in the sample image data and content of the sample images are not limited in the embodiments of this application. In the following embodiments, exemplary description is made by using an example in which the sample image data includes a plurality of sample images, and the facial expressions of the persons in the sample images are different.

S603. Process the sample audio data and the sample image data by using the to-be-trained generation network model, to obtain a predicted training result.

In some embodiments, the sample audio data and the sample image data are processed by using the to-be-trained generation network model, to obtain the predicted training result.

Figure 7:
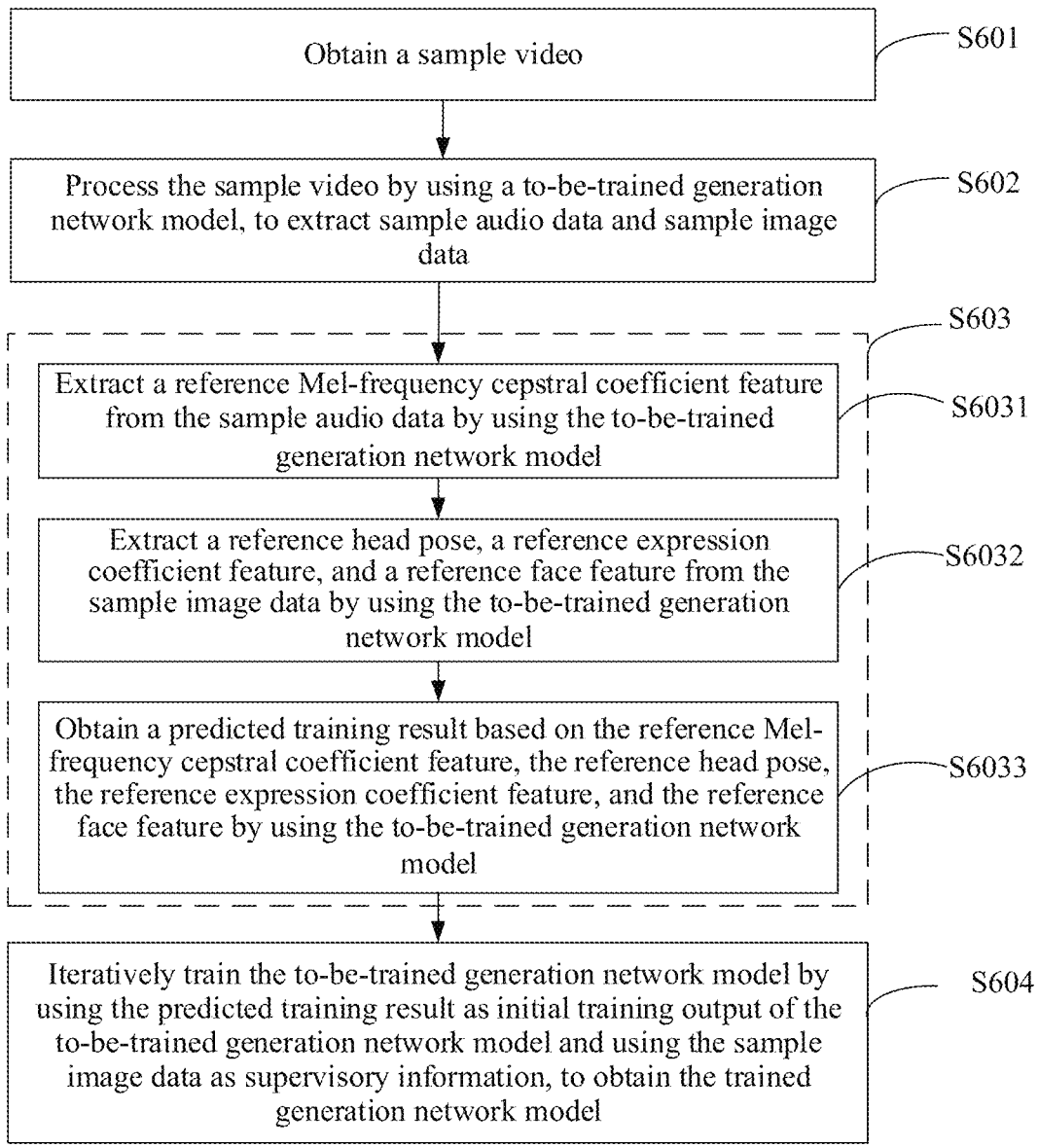
FIG. 7 is a schematic flowchart of a yet further method for generating a dynamic image based on audio according to an embodiment of this application.

Referring to FIG. 7, in some embodiments, S603 may include S6031-S6033.

S6031. Extract a reference Mel-frequency cepstral coefficient from the sample audio data by using the to-be-trained generation network model.

In some embodiments, feature extraction is performed on the sample audio data by using the to-be-trained generation network model, so that the reference Mel-frequency cepstral coefficient is extracted from the sample audio data. The manner of extracting the reference Mel-frequency cepstral coefficient from the sample audio data by using the to-be-trained generation network model may be same as the manner of determining the target Mel-frequency cepstral coefficient from the reference audio in S1041.

S6032. Extract a reference head pose, a reference expression coefficient feature, and a reference face feature from the sample image data by using the to-be-trained generation network model.

In some embodiments, feature extraction is performed on the sample image data by using the to-be-trained generation network model, so as to extract the reference head pose, the reference expression coefficient feature, and the reference face feature from the sample image data.

S6033. Obtain the predicted training result based on the reference Mel-frequency cepstral coefficient, the reference head pose, the reference expression coefficient feature, and the reference face feature by using the to-be-trained generation network model.

In some embodiments, the reference Mel-frequency cepstral coefficient, the reference head pose, the reference expression coefficient feature, and the reference face feature are input into the to-be-trained generation network model. The predicted training result is obtained based on the reference Mel-frequency cepstral coefficient, the reference head pose, the reference expression coefficient feature, and the reference face feature by using the to-be-trained generation network model.

A structure of the to-be-trained generation network model is same as that of the trained generation network model, and details are not described herein again.

S604. Iteratively train the to-be-trained generation network model by using the predicted training result as initial training output of the to-be-trained generation network model and using the sample image data as supervisory information, to obtain the trained generation network model.

Figure 8:
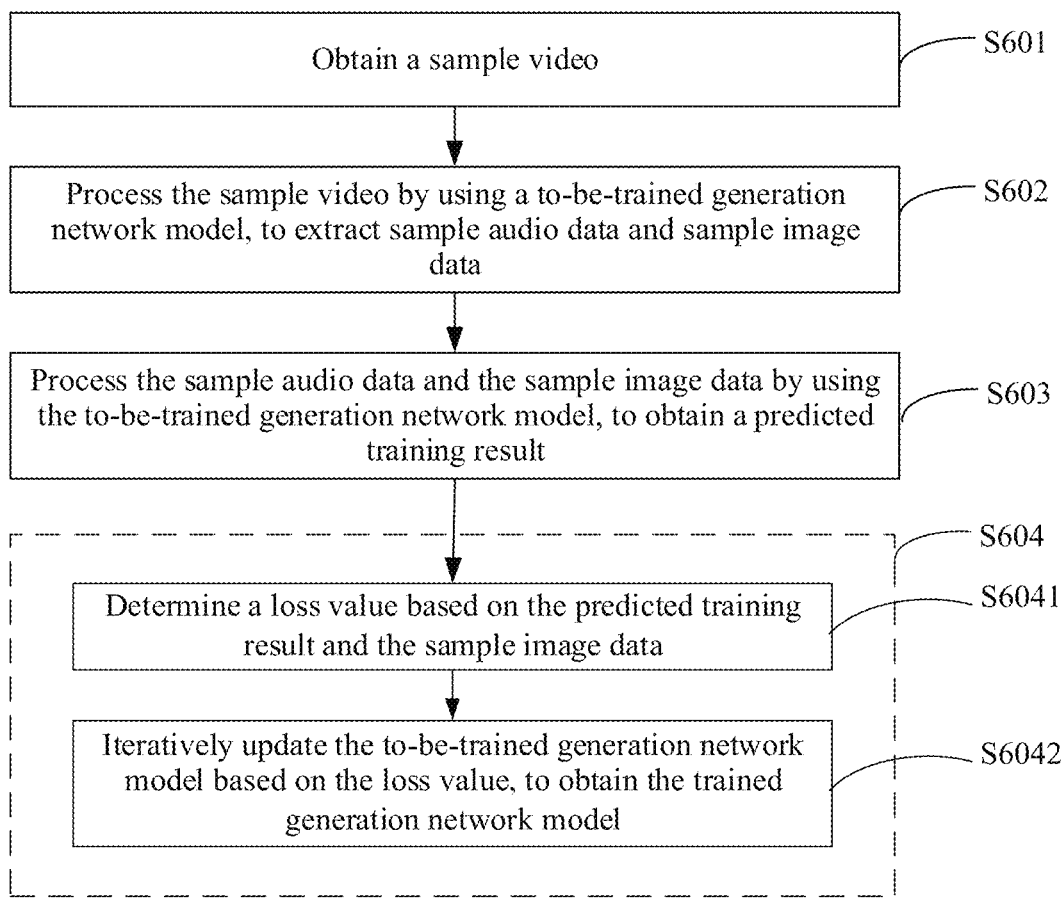
FIG. 8 is a schematic flowchart of a still yet further method for generating a dynamic image based on audio according to an embodiment of this application.

Referring to FIG. 8, in some embodiments, S604 may include the following steps.

S6041. Determine a loss value based on the predicted training result and the sample image data.

In some embodiments, the loss value between the predicted training result and the sample image data is determined based on a preset loss function. The preset loss function may be a cross-entropy loss function.

Manners for determining the loss value between the predicted training result and the sample image data is not limited in the embodiments of this application. In the following embodiments, exemplary description is made by using an example in which the loss value between the predicted training result and the sample image data is determined based on the preset loss function.

S6042. Iteratively update the to-be-trained generation network model based on the loss value, to obtain the trained generation network model.

In some embodiments, the to-be-trained generation network model is iteratively updated based on the loss value, until the loss value no longer increases or is smaller than a preset loss threshold, so as to obtain the trained generation network model.

Figure 9:
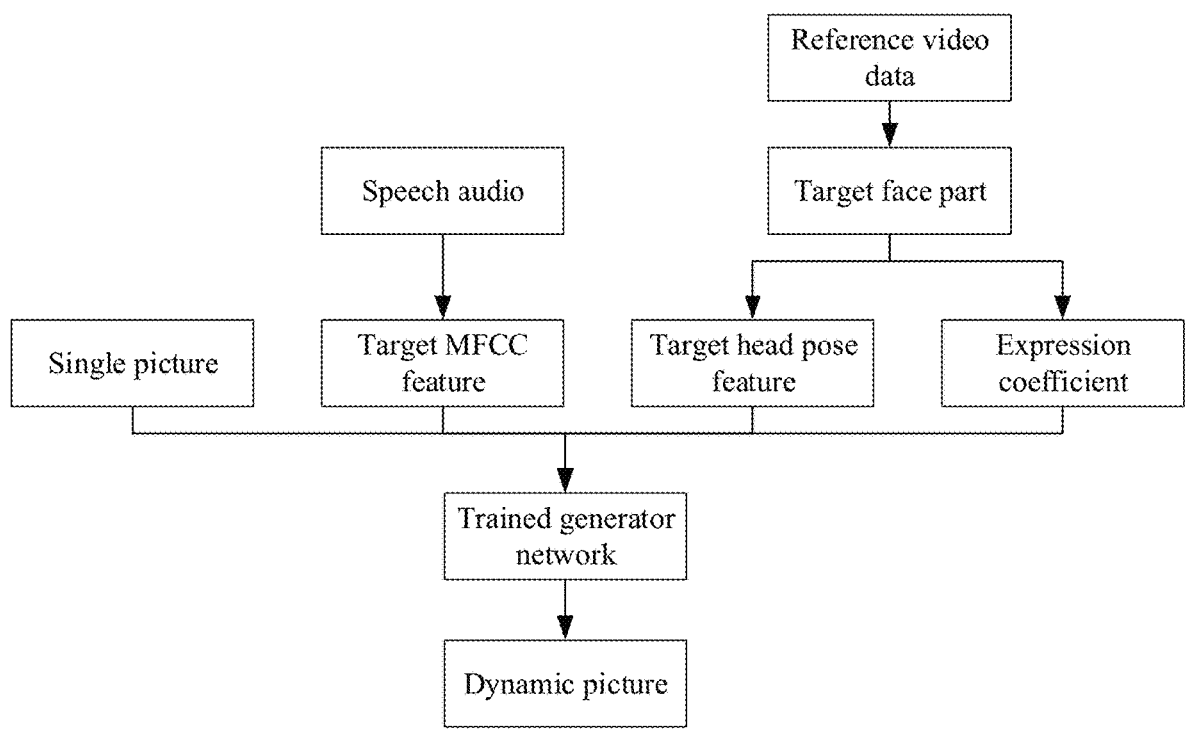
FIG. 9 is a schematic flowchart of even yet another method for generating a dynamic image based on audio according to an embodiment of this application.

As shown in FIG. 9, in some embodiments, this application provides another method for generating a dynamic image based on audio, including: obtaining reference video data (reference data) and speech audio (reference audio) first. The reference video data and the speech audio may be obtained simultaneously or separately. A sequence of obtaining the reference video data and the speech audio is not limited in the embodiments of this application. In the following embodiments, exemplary description is made by using an example in which the reference video data and the speech audio are obtained separately.

After the reference video data and the speech audio are obtained respectively, the reference video data is processed to obtain a target face part. Subsequently, feature extraction is performed on the target face part to obtain a head pose (a target head pose feature) and an expression coefficient (a target expression coefficient feature). Moreover, feature extraction is performed on the speech audio to obtain a target Mel-frequency cepstral coefficient (MFCC) feature. A sequence of performing feature extraction on the speech audio and the target face part is not limited in the embodiments of this application. In the embodiments of this application, exemplary description is made by using an example in which feature extraction is performed on the speech audio and the target face part simultaneously.

After the expression coefficient, the head pose, and the target MFCC feature are obtained, the expression coefficient, the head pose, the target MFCC feature, and a single picture (a to-be-processed image) are input into a trained generator network (a target generation network model) to generate a dynamic picture (a target dynamic image) based on the expression coefficient, the head pose, the target MFCC feature, and the single picture by using the trained generator network. The trained generator network is obtained based on the trained generation network model. To be specific, the head pose and the expression coefficient are input into the trained generation network model to fine adjust a model parameter in the trained generation network model, so as to obtain the trained generator network.

Figure 10:
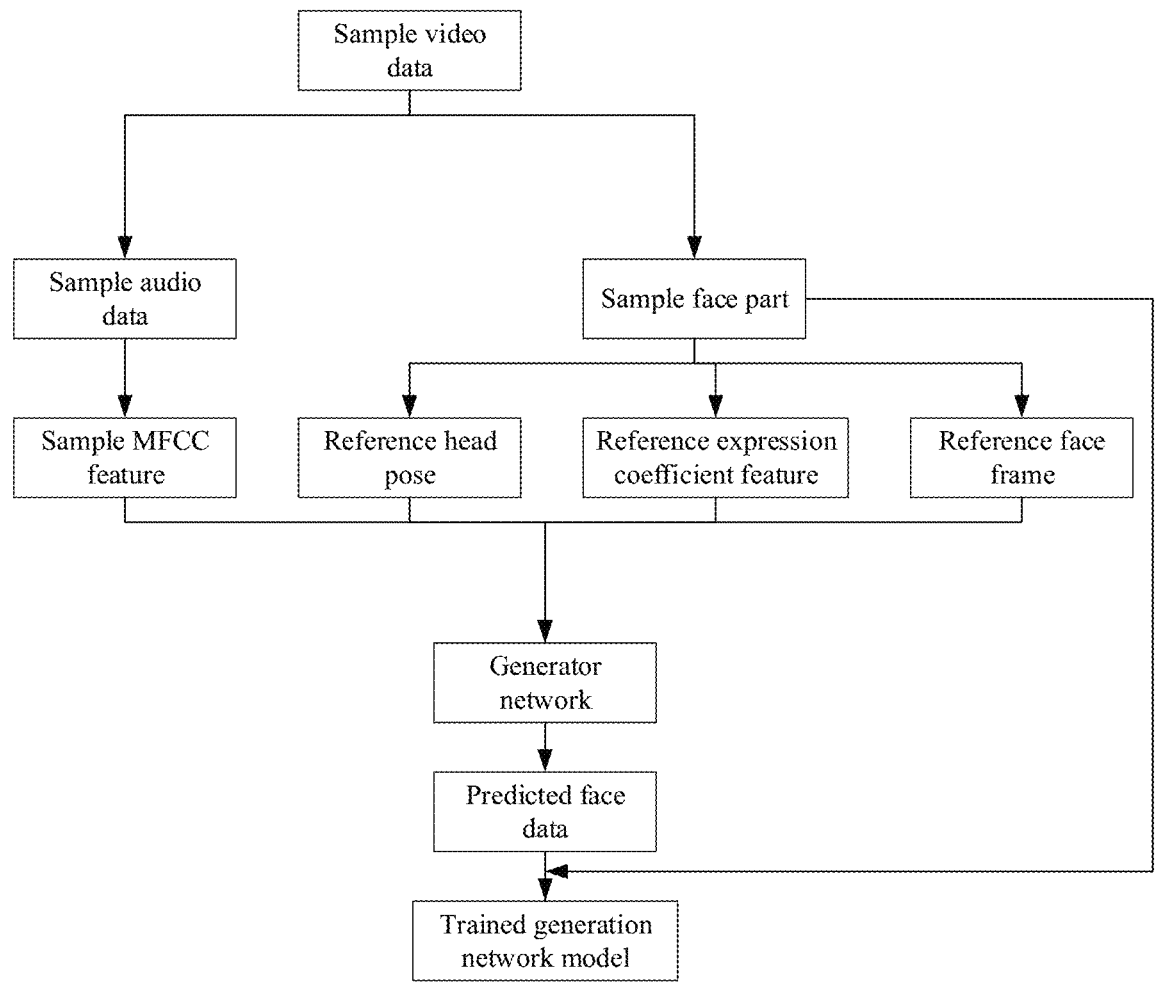
FIG. 10 is a schematic flowchart of a method for training a generation network model according to an embodiment of this application.

As shown in FIG. 10, in some embodiments, this application further provides a method for training a generation network model, including:

obtaining sample video data first; and then processing the sample video data to obtain standard digital audio data (wav) and a sample face part (sample image data); subsequently, performing feature extraction on the wav (which is also referred to as sample audio data) to obtain a sample MFCC feature; and processing the sample face part to obtain a reference head pose, a reference expression coefficient feature, and a reference face frame (a reference face feature). A sequence of performing feature extraction on the wav and the sample face part is not limited in the embodiments of this application. In the embodiments of this application, exemplary description is made by using an example in which feature extraction is performed on the wav and the sample face part simultaneously.

After being obtained, the reference head pose, the reference expression coefficient feature, the reference face frame, and the sample MFCC feature are input into a generator network (a to-be-trained generation network model), so as to generate predicted face data (a predicted training result) by using the generator network. Finally, a trained generation network model is obtained based on a loss value between the predicted face data and the sample face part, so as to complete training for the generation network model.

Corresponding to the embodiments of the foregoing method for generating a dynamic image based on audio, this application further provides embodiments of an apparatus for generating a dynamic image based on audio.

Figure 11:
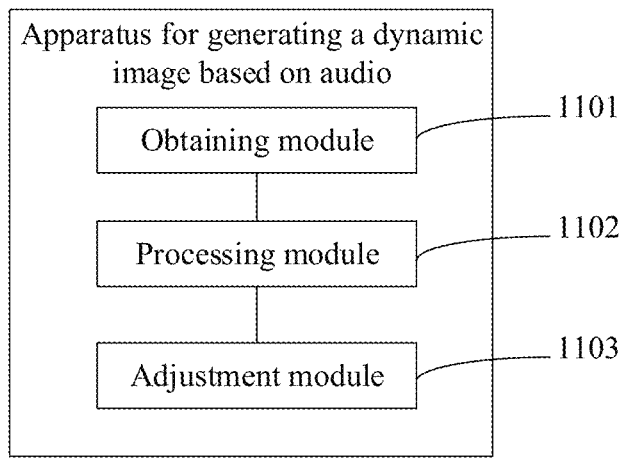
FIG. 11 is a schematic diagram of a structure of an apparatus for generating a dynamic image based on audio according to an embodiment of this application.

Referring to FIG. 11, an embodiment of this application provides an apparatus for generating a dynamic image based on audio, including:

an obtaining module 1101, configured to obtain a reference image and reference audio input by a user;

a processing module 1102, configured to determine a target head pose feature and a target expression coefficient feature based on the reference image and a trained generation network model; and an adjustment module 1103, configured to adjust the trained generation network model based on the target head pose feature and the target expression coefficient feature, to obtain a target generation network model.

The processing module 1102 is further configured to process a to-be-processed image based on the reference audio, the reference image, and the target generation network model, to obtain a target dynamic image. The target dynamic image represents a dynamic image indicating that a target person in the to-be-processed image changes a facial expression based on the reference audio, and an image object in the to-be-processed image is same as that in the reference image.

In some embodiments, the processing module 1102 is further configured to obtain reference data based on the reference image; and is further configured to extract the target head pose feature and the target expression coefficient feature from the reference data by using the trained generation network model.

In some embodiments, the processing module 1102 is further configured to determine multiple frames of facial images of the target person from the reference data by using the trained generation network model; and is further configured to perform feature extraction based on the frames of facial images of the target person by using the trained generation network model, to obtain the target head pose feature and the target expression coefficient feature.

In some embodiments, the target generation network model includes an affine subnetwork and a driving subnetwork.

The processing module 1102 is further configured to process the to-be-processed image by using the affine subnetwork to obtain a to-be-processed feature map, and obtain a deformation feature map based on the reference audio, the reference image, and the to-be-processed feature map by using the affine subnetwork; and process the to-be-processed image based on the deformation feature map by using the driving subnetwork, to obtain the target dynamic image.

In some embodiments, the affine subnetwork includes a speech processing layer, a feature extraction layer, a feature fusion layer, and a feature affine layer.

The processing module 1102 is further configured to determine a target Mel-frequency cepstral coefficient corresponding to the reference audio by using the speech processing layer; perform feature extraction on the reference image by using the feature extraction layer, to obtain a reference feature map; perform feature extraction on the to-be-processed image by using the feature extraction layer, to obtain the to-be-processed feature map; perform feature stacking and alignment on the reference feature map and the to-be-processed feature map by using the feature fusion layer, to obtain a fused feature map; and determine an affine coefficient based on the fused feature map and the target Mel-frequency cepstral coefficient by using the feature affine layer, and perform spatial deformation in affine transformation on the reference feature map based on the affine coefficient, to obtain the deformation feature map.

In some embodiments, the driving subnetwork includes a feature processing layer, a feature synchronization layer, and an image driving layer.

The processing module 1102 is further configured to obtain an initial driving feature based on the target Mel-frequency cepstral coefficient by using the feature processing layer; drive the to-be-processed feature map based on the initial driving feature by using the image driving layer, to obtain an initial feature map; stack the deformation feature map with the initial feature map by using the feature synchronization layer, to determine a feature synchronization parameter between the deformation feature map and the initial feature map; adjust the initial driving feature based on the feature synchronization parameter by using the feature processing layer, to obtain a target driving feature; and drive the to-be-processed image based on the target driving feature by using the image driving layer, to obtain the target dynamic image.

In some embodiments, the obtaining module 1101 is further configured to obtain a sample video. A video object in the sample video is different from an image object in the to-be-processed image.

The processing module 1102 is further configured to process the sample video by using a to-be-trained generation network model, to extract sample audio data and sample image data; is further configured to process the sample audio data and the sample image data by using the to-be-trained generation network model, to obtain a predicted training result; and is further configured to iteratively train the to-be-trained generation network model by using the predicted training result as initial training output of the to-be-trained generation network model and using the sample image data as supervisory information, to obtain the trained generation network model.

In some embodiments, the processing module 1102 is further configured to extract a reference Mel-frequency cepstral coefficient from the sample audio data by using the to-be-trained generation network model; is further configured to extract a reference head pose, a reference expression coefficient feature, and a reference face feature from the sample image data by using the to-be-trained generation network model; and is further configured to obtain the predicted training result based on the reference Mel-frequency cepstral coefficient, the reference head pose, the reference expression coefficient feature, and the reference face feature by using the to-be-trained generation network model.

In some embodiments, the processing module 1102 is further configured to determining a loss value based on the predicted training result and the sample image data; and is further configured to iteratively update the to-be-trained generation network model based on the loss value, to obtain the trained generation network model.

Figure 12:
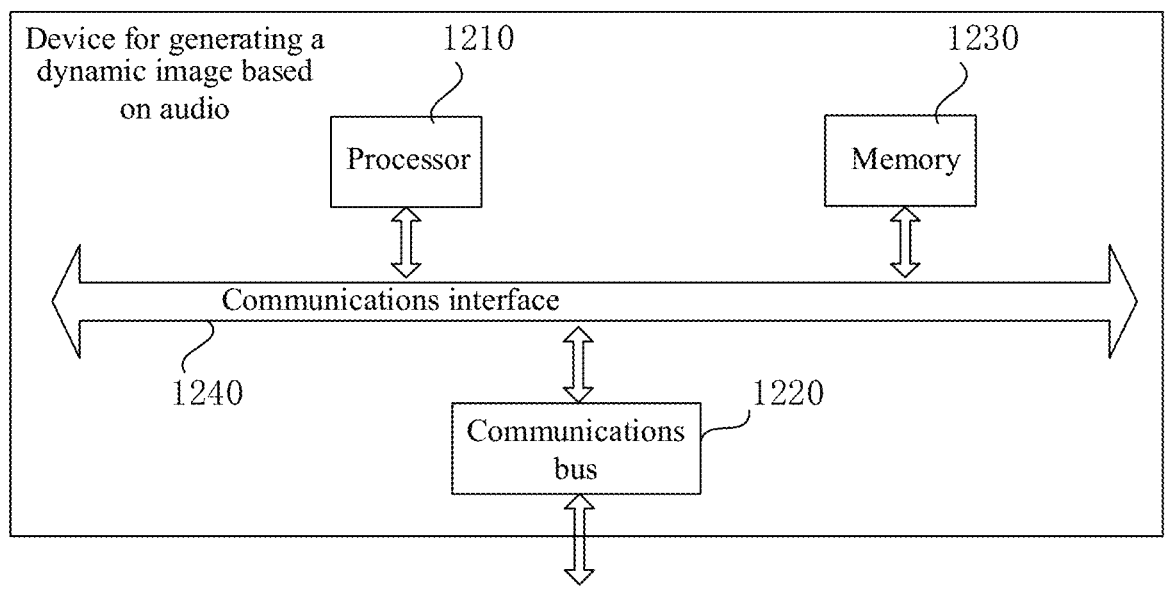
FIG. 12 is a schematic diagram of a structure of an electronic device according to an embodiment of this application.

As shown in FIG. 12, an electronic device provided in an embodiment of this application may include: a processor 1210, a communications interface 1220, a memory 1230, and a communications bus 1240. The processor 1210, the communications interface 1220, and the memory 1230 communicate with each other through the communications bus 1240. The processor 1210 may invoke logical instructions in the memory 1230 to implement the foregoing methods.

In addition, when the logical instructions in the memory 1230 may be executed in a form of a software functional unit and may be sold or used as an independent product, the logical instructions may be stored in a computer readable storage medium. On the basis of such understanding, the technical solutions of the present invention essentially, or parts of the technical solutions of the present invention that attribute to the prior art, or part of the technical solutions may be represented in the form of software products. A computer software product is stored in a storage medium, and includes a plurality of instructions to enable one computer device (which may be a personal computer, a server, or a network device) to implement all or some steps of the method for generating a dynamic image based on audio in all embodiments of the present invention. Moreover, the foregoing storage medium includes: a U disk, a portable hard disk, a read-only memory (ROM), a random access memory (RAM), a magnetic disk, a compact disc, or other media that can store program code.

According to still another aspect, the present invention further provides a non-transient computer readable storage medium, on which a computer program is stored. The computer program implements steps of the foregoing methods while being executed by a processor.

The device embodiments described above are merely exemplary. The units described as separated parts may be or may not be physically separated; and parts displayed as units may be or may not be physical unit, that is, may be located at one place or may be distributed on a plurality of network units. Some or all of the modules may be selected according to actual requirements to achieve the objectives of the solutions of the embodiments. This may be understood and implemented by persons of ordinary skills in the art without an effective effort.

According to the description of the foregoing implementations, a person skilled in the art may clearly understand that the various implementations may be implemented through software in combination with a necessary general hardware platform; and certainly, may also be implemented by hardware. On the basis of such understanding, the foregoing technical solutions essentially or parts of the technical solutions that attribute to the prior art may be represented in software products. A computer software product may be stored in the computer readable storage medium, such as the ROM/RAM, the magnetic disk, or the compact disc, and includes a plurality of instructions to enable a computer device (which may be a personal computer, a server, a network device, or the like) to implement the methods in all embodiments or in some of the embodiments.

Finally, it should be noted that the foregoing embodiments are merely intended to describe the technical solutions of the present invention, and shall not be construed as limitation. Although the present invention is described in detail with reference to the foregoing embodiments, one of ordinary skills in the art may understand that modifications still may be made to the technical solutions disclosed in the foregoing embodiments, or equivalent replacements may be made to some of the technical features. However, these modifications or replacements do not deviate the nature of corresponding technique solutions from the spirit and scope of the technique solutions of the embodiments of the present invention.

What is claimed is:

1. A method implemented by a computer device and for generating a target dynamic image based on audio, comprising:

obtaining a reference image and reference audio input by a user;

determining a target head pose feature and a target expression coefficient feature based on the reference image and a trained generation network model, wherein the trained generation network model is configured to generate a plurality of predicted images based on the input reference image, and determine a target head pose feature and a target expression coefficient feature based on a difference between each predicted image and the reference image;

adjusting parameters of the trained generation network model based on the target head pose feature and the target expression coefficient feature, to obtain a target generation network model; and processing a to-be-processed image based on the reference audio, the reference image, and the target generation network model, to obtain a target dynamic image, wherein the target dynamic image represents a dynamic image indicating that a target person in the to-be-processed image changes a facial expression based on the reference audio, an image object in the to-be-processed image is same as that in the reference image, and the target generation network model is configured to obtain a target driving feature based on the input reference audio and reference image, and drive a target area in the input to-be-processed image based on the target driving feature to output the target dynamic image, wherein the determining a target head pose feature and a target expression coefficient feature based on the reference image and a trained generation network model comprises:

obtaining reference data based on a video with preset duration that is generated based on the reference image, wherein the reference data is obtained by processing the reference image;

extracting the target head pose feature and the target expression coefficient feature from the reference data by using the trained generation network model; and wherein the target generation network model comprises an affine subnetwork and a driving subnetwork; and the processing a to-be-processed image based on the reference audio, the reference image, and the target generation network model, to obtain a target dynamic image comprises:

processing the to-be-processed image by using the affine subnetwork to obtain a to-be-processed feature map, and obtaining a deformation feature map based on the reference audio, the reference image, and the to-be-processed feature map by using the affine subnetwork, wherein the affine subnetwork is configured to determine a target Mel-frequency cepstral coefficient corresponding to the reference video, perform feature extraction on the reference image to obtain a reference feature image, and perform affine transformation on the reference feature image to obtain the deformation feature image; and processing the to-be-processed image based on the deformation feature map by using the driving subnetwork, to obtain the target dynamic image, wherein the driving subnetwork is configured to drive the to-be-processed image to obtain the target dynamic image.

2. The method according to claim 1, wherein the extracting the target head pose feature and the target expression coefficient feature from the reference data by using the trained generation network model comprises:

determining multiple frames of facial images of the target person from the reference data by using the trained generation network model; and performing feature extraction based on the frames of facial images of the target person by using the trained generation network model, to obtain the target head pose feature and the target expression coefficient feature.

3. The method according to claim 1, wherein the affine subnetwork comprises a speech processing layer, a feature extraction layer, a feature fusion layer, and a feature affine layer; and the processing the to-be-processed image by using the affine subnetwork to obtain a to-be-processed feature map, and obtaining a deformation feature map based on the reference audio, the reference image, and the to-be-processed feature map by using the affine subnetwork comprises:

determining a target Mel-frequency cepstral coefficient corresponding to the reference audio by using the speech processing layer;

performing feature extraction on the reference image by using the feature extraction layer, to obtain a reference feature map;

performing feature extraction on the to-be-processed image by using the feature extraction layer, to obtain the to-be-processed feature map;

performing feature stacking and alignment on the reference feature map and the to-be-processed feature map by using the feature fusion layer, to obtain a fused feature map; and determining an affine coefficient based on the fused feature map and the target Mel-Mel-frequency cepstral coefficient by using the feature affine layer, and performing spatial deformation in affine transformation on the reference feature map based on the affine coefficient, to obtain the deformation feature map.

4. The method according to claim 3, wherein the driving subnetwork comprises a feature processing layer, a feature synchronization layer, and an image driving layer; and the processing the to-be-processed image based on the deformation feature map by using the driving subnetwork, to obtain the target dynamic image comprises:

obtaining an initial driving feature based on the target Mel-frequency cepstral coefficient by using the feature processing layer;

driving the to-be-processed feature map based on the initial driving feature by using the image driving layer, to obtain an initial feature map;

stacking the deformation feature map with the initial feature map by using the feature synchronization layer, to determine a feature synchronization parameter between the deformation feature map and the initial feature map;

adjusting the initial driving feature based on the feature synchronization parameter by using the feature processing layer, to obtain the target driving feature; and driving the to-be-processed image based on the target driving feature by using the image driving layer, to obtain the target dynamic image.

5. The method according to any one of claim 1, wherein the method further comprises:

obtaining a sample video, wherein a video object in the sample video is different from an image object in the to-be-processed image;

processing the sample video by using a to-be-trained generation network model, to extract sample audio data and sample image data;

processing the sample audio data and the sample image data by using the to-be-trained generation network model, to obtain a predicted training result; and iteratively training the to-be-trained generation network model by using the predicted training result as initial training output of the to-be-trained generation network model and using the sample image data as supervisory information, to obtain the trained generation network model.

6. The method according to claim 5, wherein the processing the sample audio data and the sample image data by using the to-be-trained generation network model, to obtain a predicted training result comprises:

extracting a reference Mel-frequency cepstral coefficient from the sample audio data by using the to-be-trained generation network model;

extracting a reference head pose, a reference expression coefficient feature, and a reference face feature from the sample image data by using the to-be-trained generation network model; and obtaining the predicted training result based on the reference Mel-frequency cepstral coefficient, the reference head pose, the reference expression coefficient feature, and the reference face feature by using the to-be-trained generation network model.

7. The method according to claim 5, wherein the iteratively training the to-be-trained generation network model by using the predicted training result as initial training output of the to-be-trained generation network model and using the sample image data as supervisory information, to obtain the trained generation network model comprises:

determining a loss value based on the predicted training result and the sample image data; and iteratively updating the to-be-trained generation network model based on the loss value, to obtain the trained generation network model.

8. An electronic device, comprising a memory, a processor, and a computer program stored in the memory and capable of running on the processor, wherein the processor is configured to execute the computer program to implement steps of the method according to claim 1.

9. A non-transient computer readable storage medium, on which a computer program is stored, wherein the computer program implements steps of the method according to claim 1 while being executed by a processor.

* * * * *